(12) United States Patent
Naor et al.

(10) Patent No.: US 7,327,679 B2
(45) Date of Patent: Feb. 5, 2008

(54) METHOD OF PROVIDING QOS AND BANDWIDTH ALLOCATION IN A POINT TO MULTI-POINT NETWORK

(75) Inventors: Joseph Naor, Haifa (IL); Raphael J. Rom, Haifa (IL); David Ivancovsky, Maccabim (IL)

(73) Assignee: Broad-Light, Ltd., Ramat Gan (IL)

( * ) Notice: Subject to any disclaimer, the term of this patent is extended or adjusted under 35 U.S.C. 154(b) by 1076 days.

(21) Appl. No.: 10/219,484

(22) Filed: Aug. 16, 2002

(65) Prior Publication Data

US 2003/0081626 A1 May 1, 2003

Related U.S. Application Data

(60) Provisional application No. 60/313,500, filed on Aug. 21, 2001.

(51) Int. Cl.
*H04L 12/28* (2006.01)
*H04B 7/212* (2006.01)

(52) U.S. Cl. ........................... 370/232; 370/444

(58) Field of Classification Search ............ 370/229, 370/230, 232, 235, 252, 431, 432, 433, 442, 370/444; 718/104, 105
See application file for complete search history.

(56) References Cited

U.S. PATENT DOCUMENTS 5,748,629 A * 5/1998 Caldara et al. ............. 370/389
6,072,800 A 6/2000 Lee
6,408,005 B1 * 6/2002 Fan et al. ................... 370/412
6,442,138 B1 8/2002 Yin et al.
6,452,905 B1 9/2002 Smith et al.
6,823,385 B2 * 11/2004 McKinnon et al. ......... 709/226
6,917,622 B2 * 7/2005 McKinnon et al. ......... 370/420
2004/0208194 A1* 10/2004 Restivo et al. ............. 370/443
2005/0243745 A1* 11/2005 Stanwood et al. .......... 370/280

FOREIGN PATENT DOCUMENTS

WO WO 9917482 A2 * 4/1999

* cited by examiner

*Primary Examiner*—Doris H. To
*Assistant Examiner*—Kerri M Rose
(74) *Attorney, Agent, or Firm*—DLA Piper US LLP

(57) ABSTRACT

An upstream bandwidth allocation scheduler is provided for use within a Line Termination (LT) unit in a point to multi-point data communications network in order to service multiple Network Termination (NT) units. The scheduler first allocates bandwidth among the several categories of data handled by the network (e.g., voice, IP, and ATM data), and then allocates bandwidth among the several users for each category within the network. A function $f$ is defined, as part of a "min-max weighted fairness" scheme, in order to allocate surplus bandwidth among both the categories and users of the network. The scheduler of the present invention, while allocating upstream bandwidth, also supports various quality of service (QoS) categories to subscribers of the network.

5 Claims, 5 Drawing Sheets

METHOD OF PROVIDING QOS AND BANDWIDTH ALLOCATION IN A POINT TO MULTI-POINT NETWORK

This application claims priority from U.S. Provisional Application No. 60/313,500, filed Aug. 21, 2001. The entirety of this provisional application is incorporated herein by reference.

BACKGROUND OF THE INVENTION

1. Field of the Invention

The present invention relates generally to broadband data communications networks, and more particularly to a computer-based method for allocating bandwidth among several network termination nodes within such networks.

2. Related Art

Metropolitan area networks (MANs) are broadband networks that interconnect several local area networks (LANs) and are operated by network service providers (e.g., local exchange carriers (LECs)). Each of the interconnected LANs may cross administrative boundaries (i.e., be owned and operated by different customers or subscribers of the network service provider which comprise different "offices").

A MAN is characterized by a Line Termination (LT) unit which is the "network-side" interface, operated by the network service provider, to each of the customers' Network Termination (NT) units. The LT represents the part of the broadband network where the network service provider's responsibility begins (for downstream data) and ends (for upstream data). In contrast, an NT unit is the "user-side" of the broadband network. Each NT is located at the customer premises and serves its LAN, Private Branch Exchange (PBX) and other local communications networks.

Within a MAN, the LT operated by the network service provider is responsible for aggregating all traffic from each of the NT units connected to it. This aggregation serves to connect customers' local voice data to the Public Switched Telephone Network (PSTN), and to connect other local data to various outside networks, such as Internet Protocol (IP) networks, Asynchronous Transfer Mode (ATM) networks and the like.

Within MANs, there are several technologies that are currently employed to transmit broadband (i.e., voice and other) data between the LT unit and the NT units. These technologies are often referred to as "Access" technologies and include Passive Optical Networks (PON), Wireless Local Loop (WLL) and Cable Modems. These different Access technologies, however, have one thing in common—a point to multi-point topology. That is, the MAN topology is a point (i.e., a single LT) to multi-point (i.e., multiple NTs) topology.

A point to multi-point topology creates a situation where the data flow within the MAN network is non-symmetrical. In the "downstream" direction (i.e., from the single LT to the multiple NTs), data is broadcast (i.e., simultaneously transmitted to all NTs) from the LT. In the "upstream" direction (i.e., from the multiple NTs to the single LT), however, a Time Division Multiple Access (TDMA) scheme is often employed. TDMA allows each NT to obtain a grant of a window (i.e., a "time slot") when it can send voice and other data to the LT for eventual transmission to the PSTN, Internet and other wide area networks. Currently, there exists no general methodology that ensures an LT efficiently and fairly allocates system resources (e.g., bandwidth) while attempting to maintain the subscribed Quality of Service (QoS) among the several NTs within a MAN.

In view of the foregoing, a method of providing upstream QoS and bandwidth allocation within an LT unit in a point to multi-point broadband network is needed.

SUMMARY OF THE INVENTION

The present invention meets the above-identified need by providing a method and computer program, which may be implemented on a Line Termination interface unit, that efficiently and fairly allocates system resources—upstream bandwidth—while attempting to maintain the QoS which a user has subscribed to in a point to multi-point network.

The method and computer program product of the present invention includes the steps of first allocating bandwidth among the QoS categories of data handled by the network (e.g., various voice, IP and ATM data categories), and then allocating bandwidth among the several users within each category.

With respect to allocating bandwidth among the several QoS categories, the method and computer program product of the present invention include the steps of allocating a nominal bandwidth amount to each of the service categories within the network and measuring, at predetermined times (i.e., at certain time intervals), the actual bandwidth demand for each of these categories. The effective bandwidth amounts for categories whose demand does not exceed their nominal bandwidth is set to equal the actual bandwidth demand. Next, the effective bandwidth amounts is initially set to equal to the nominal bandwidth amount for each of the service categories whose actual bandwidth demand does exceed its nominal bandwidth amount.

Then, whether there is excess bandwidth to be distributed among the service categories within the network is determined. If so, the excess bandwidth is distributed among the categories whose actual bandwidth demand does exceed its nominal bandwidth amount using a distribution function $f$. A reasonable choice for function $f$ is min-max weighting. Thus, in an embodiment, function $f$ utilizes two weighted parameters—the nominal bandwidth amount and the excess subscription factor for each category.

The method and computer program product of the present invention for allocating bandwidth among the users of the network mirrors the category bandwidth allocation process described above. The effective bandwidth assigned to each category by the above-described process is thus utilized as the total amount of bandwidth available to distribute among the users within each of those categories.

An advantage of the present invention is that it can function in a distributed manner. That is, measurements are made remotely at the several NT's, while the scheduling is controlled by the network service provider's LT.

Further features and advantages of the present invention as well as the structure and operation of various embodiments are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

I. Overview

Figure 1:
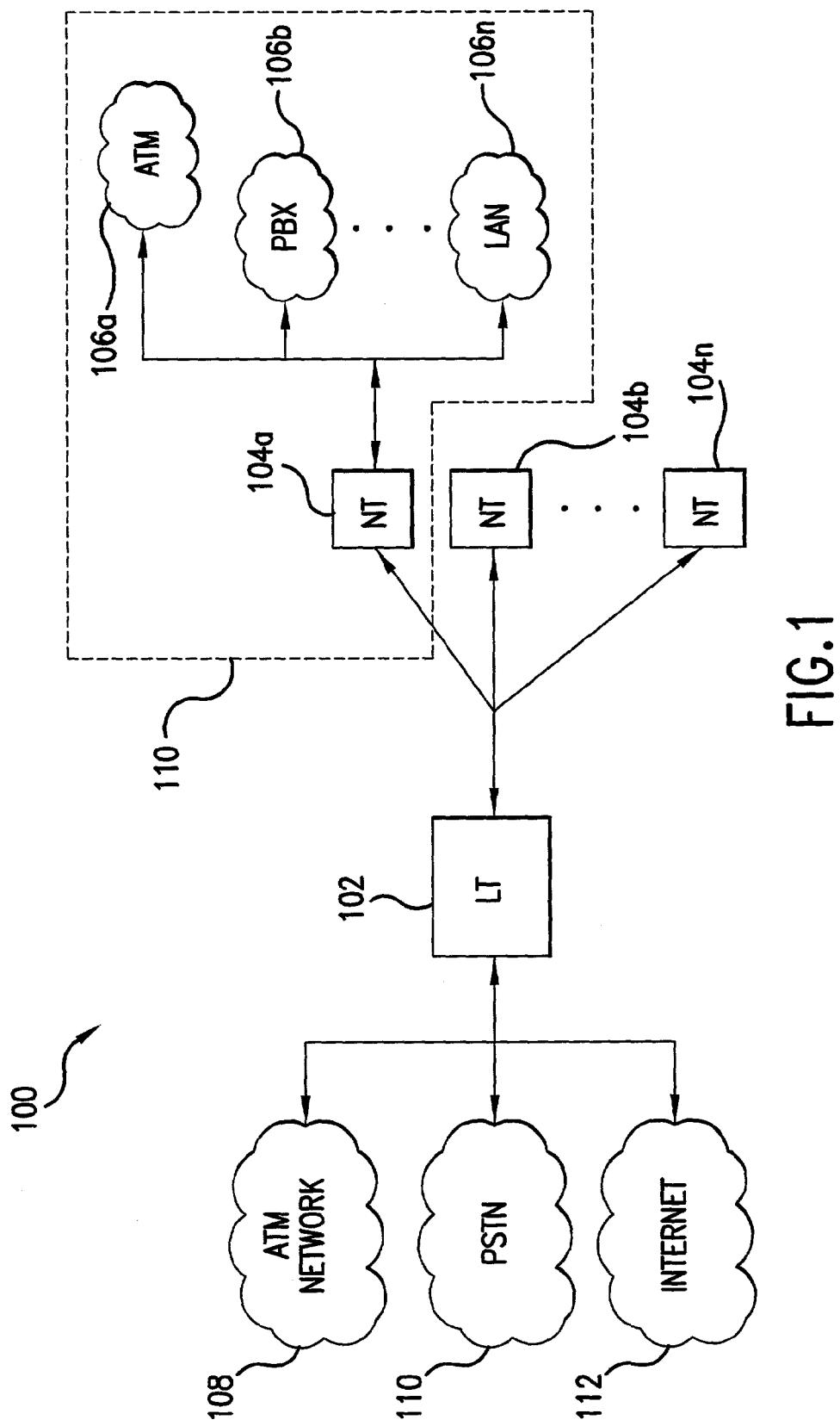
FIG. 1 is a block diagram representing the topology of a metropolitan area network in which, in a preferred embodiment, the present invention is utilized.

The method and computer program product of the present invention provides upstream and downstream QoS and bandwidth allocation within an LT unit in a point to multi-point network.

In an embodiment of the present invention, a network service provider operates a metropolitan area network (MAN). The MAN has a point to multi-point topology where a single Line Termination (LT) interface unit serves multiple Network Termination (NT) interface units located at subscriber premises. The LT allows the subscribers' local communications networks (e.g., Private Branch Exchange (PBX) and a local area network (LAN)) to be connected to wide area networks such as the Public Switched Telephone Network (PSTN) and the Internet.

In the environment of such an embodiment, the network service provider would provide the hardware (e.g., LT) and software (e.g., LT scheduler) infrastructure, customer support, service agreements and billing mechanism to allow its LT to allocate upstream bandwidth for its customers' NTs while attempting to maintain the QoS its customers have subscribed to.

The present invention is described in terms of the above example. This is for convenience only and is not intended to limit the application of the present invention. In fact, after reading the following description, it will be apparent to one skilled in the relevant art(s) how to implement the following invention in alternative embodiments. For example, the present invention may be applied to downstream traffic, although the more difficult case of upstream traffic is discussed herein.

As used herein, "bandwidth" refers to the capacity to move information (i.e., data) and more particularly refers (in telecommunications) to the width of a communications channel. While in analog communications, bandwidth is measured in Hertz, in digital communications, as here, it is measured in bits per second (bps).

As used herein, "quality of service (QoS)" refers to the measure of service quality or performance properties of a communications network. QoS is a multi-component measurement which may include throughput, packet loss, transit delay and priority. QoS may also include measurements, in ATM networks for example, such as mean cell transfer delay, cell loss ratio and cell error ratio.

As used herein, "category of service" or "service categories" refers to a QoS level that a user of the communications network (i.e., the MAN) subscribes to and thus, the QoS level the network service provider has committed to at the time of subscription (i.e., in a Service Level Agreement (SLA)). In general, the network service provider decides on the specific QoS levels (i.e., values of a parameter P) and offers them to its users for specific types of data traffic. A user may choose traffic with P=0, which indicates that the user is not willing to risk any loss of traffic or suffer delay. For P>0, the parameter P can be determined based on, but not exclusively, the buffer size of the user's local communications network, how bursty the user's traffic is, and the sensitivity of the traffic to cell loss. The choice of P influences the delay that the user's traffic suffers. Thus, P controls several QoS parameters, and in general this mixture of QoS parameters determines a "better" service for smaller values of P.

Data traffic that tends to contain File Transfer Protocol (FTP) and Hypertext Transfer Protocol (HTTP) requests is less sensitive to cell loss. For traffic with "deadlines," such as a video conferencing data, smaller values of P would be more appropriate. It is possible that a user with large financial resources will purchase service with a lower P compared to other users just so that it receives better service. It is also plausible that different departments may subscribe to different levels of service within the same company. For example, an accounting department at the end of a fiscal quarter may receive service at a lower value of P than during other times.

Presumably, the "better" service for smaller values of P come at a higher subscription costs for users of the network. Thus, the choice of service category depends not only on the characteristic of the application, but also on the willingness of users to pay the service provider for better service. A user will look at the offered values of P and choose from them according to the mix of parameters important to them.

Lastly, the terms "user," "subscriber," "customer," "office," "organization," and the plural form of these terms are used interchangeably throughout herein to refer to those who would benefit from the method and computer program product of the present invention that provides upstream QoS and bandwidth allocation within an LT unit in a point to multi-point network.

II. Network Topology and Architecture

FIG. 1 is a block diagram illustrating the topology of a broadband metropolitan area network (MAN) 100 in which, in a preferred embodiment, the present invention is utilized. Network 100 includes a Line Termination (LT) interface unit 102 operated by a network service provider and serves a plurality of Network Termination (NT) interface units 104 (shown as NT 104*a-n* in FIG. 1). The topology of MAN 100 is a point (LT 102) to multi-point (NT 104*a-n*) topology.

Each NT 104 is located at a customer premises 110 and serves one or more local communications networks 106 (e.g., an Asynchronous Transfer Mode (ATM) network 106*a*, a Private Branch Exchange (PBX) 106*b* and a local area network (LAN) 106*n*). (Only one customer premises 110, however, is shown in FIG. 1 for ease of explanation herein). That is, each NT 104 may serve one office building floor which has multiple offices. As will be appreciated by one skilled in the relevant art(s) after reading the description herein, NT 104 may have multiple connections to the local communications networks 106. However, only one such connection is shown in FIG. 1 for ease of explanation herein.

Within MAN 100, the LT 102 operated by the network service provider is responsible for aggregating all traffic from each NT 104 connected to it in order to connect the local communications networks 106 to larger outside networks such as the Public Switched Telephone Network (PSTN) 110, Internet Protocol (IP) networks such as the global, public Internet 112, Asynchronous Transfer Mode (ATM) network 108, and various other data networks.

Figure 2:
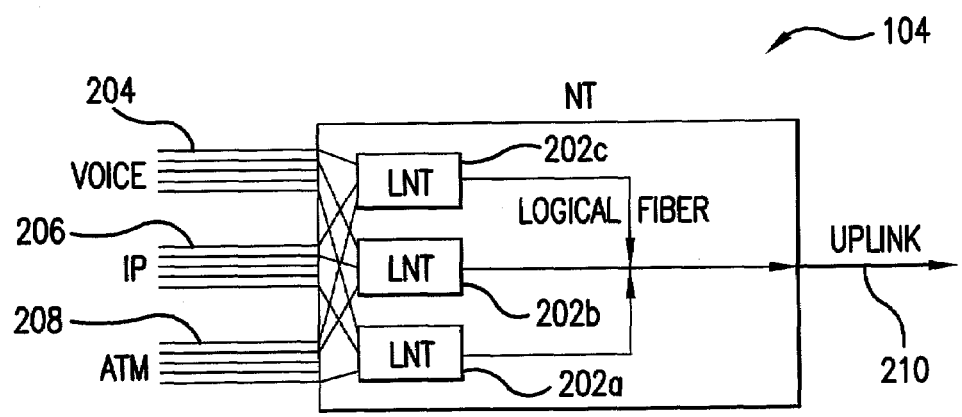
FIG. 2 is a block diagram illustrating the structure, in one embodiment of the present invention, of a Network Termination interface unit.

FIG. 2 is a block diagram illustrating the structure of an NT 104 in one embodiment of the present invention. NT 104 has a plurality of voice lines 204, a plurality of IP lines 206 and a plurality of ATM lines 208 that enter the unit 104 and are multiplexed onto a single uplink fiber 210 connected to LT 102.

Each of the voice lines 204, in an embodiment of the present invention, is a multiplexed, pulse code modulated (PCM) stream typically emanating from one of the local communications networks 106, such as PBX 106b, within site 110. In an embodiment of the present invention, each IP line 206 emanates from a router and is an interconnection of one or more of the local communications networks 106, such as LAN 106n, to the outside communications networks, such as the Internet 112. In an embodiment of the present invention, each of the ATM lines 208 is a either a cell-stream or a LAN connection to an ATM network 106a.

Figure 3:
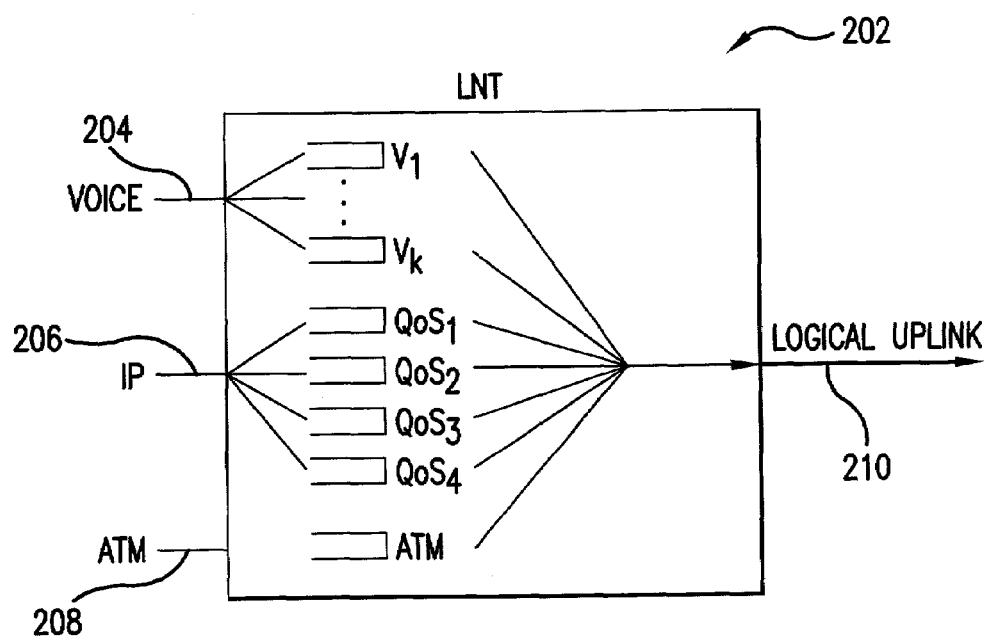
FIG. 3 is a block diagram illustrating the internal structure, in one embodiment of the present invention, of a Logical Network Termination (LNT) interface unit.

As will be appreciated by one skilled in the relevant art(s), the multiplicity of lines 204, 206 and 208 is not intended to increase bandwidth, but is the result of interconnection to different administrative domains (e.g., different offices on the same floor). As such, the bandwidth allocation scheme of the present invention treats them separately so that competing organizations receive (relatively) equitable and fair service from the network service provider's LT 102. As a result, in an embodiment, the internal structure of NT 104 is actually a collection of Logical NTs (LNT) 202 (shown as LNT 202a-c in FIG. 2), each of which belongs to a single scheduling domain and hence has at most one line of each type of data traffic (i.e., one voice line 204, one IP line 206 and one ATM line 208). This is illustrated in FIG. 3. The different types of data traffic, however, may have multiple queues for each QoS category of service (i.e., different values of parameter P). The scheduling of the present invention in a preferred embodiment, therefore, will be conducted on a per-LNT 202 basis.

The QoS and bandwidth allocation for LNTs 202 of the preferred embodiment of the present invention is achieved by implementing a novel scheduling mechanism (i.e., a scheduler) within LT 102 and is now described.

III. QoS and Bandwidth Allocation Scheme Overview

The method and computer program product of the present invention which provides upstream QoS and bandwidth allocation, on a per-LNT 202 basis, within an LT 102 in a point to multi-point broadband network 100 is now described using the parameters listed in Table 1.

TABLE 1

| Parameter | Definition |
| --- | --- |
| BW | the total amount of available bandwidth on the channel |
| $BW_i$ | the nominal amount of bandwidth allocated to the i-th service category (i.e., values of parameter P). |
| $R_i$ | the maximum amount of bandwidth offered to users of the i-th category |
| $P_i$ | the excess subscription factor for the i-th category |
| $E_i(t)$ | the effective amount of bandwidth allocated to the i-th category at time t |
| $D_i(t)$ | the current demand in the i-th category at time t |

The method and computer program product of the present invention aim to take a channel with total bandwidth BW, which is handled by a single LT 102, and allocate that channel among several LNTs 202, while supporting various QoS categories. The method and computer program product of the present invention first allocate bandwidth among the service categories within the network (i.e., the values of parameter P), and then allocate bandwidth among the several users within each service category.

The prime distinction among the service categories is the set of excess factors $P_i \geq 0$, one per category, defined as follows. At the time of subscription, users purchase certain nominal bandwidth for a category of service i. The total amount of Bandwidth allocated to the i-th category is denoted by $BW_i$, such that:

$$\sum_i BW_i \leq BW.$$

The network service provider's contract (i.e., SLA) with its subscribers of the i-th category, however, may allow the subscribers to generate data at a rate that exceeds the nominal bandwidth by at most a multiplicative factor of $(1+P_i)$. Thus, the subscribers of the i-th category can generate data at a maximal rate of: $R_i=(1+P_i)*BW_i$. As will be appreciated by one skilled in the relevant art(s), LT 102 may not be able to accommodate the excess amount of data traffic for a period of time. That is, the network service provider will typically sell subscriptions for more bandwidth than physically available within the channel handled by LT 102. A general rule of thumb, nominal bandwidth should be equal to the anticipated average demand of the users within that category i. If a congestion condition occurs, however, the scheduler within LT 102 may decide to delay or even discard some data packets. The above discussion assumes that, statistically, the excess demand will average out among users, and thus the likelihood of data loss is rather minimal. The higher the value of the excess factor, $P_i$, however, the higher the probability of overflow (and loss of packets) for that category of service.

IV. Allocation of Bandwidth Among Service Categories

Figure 5:
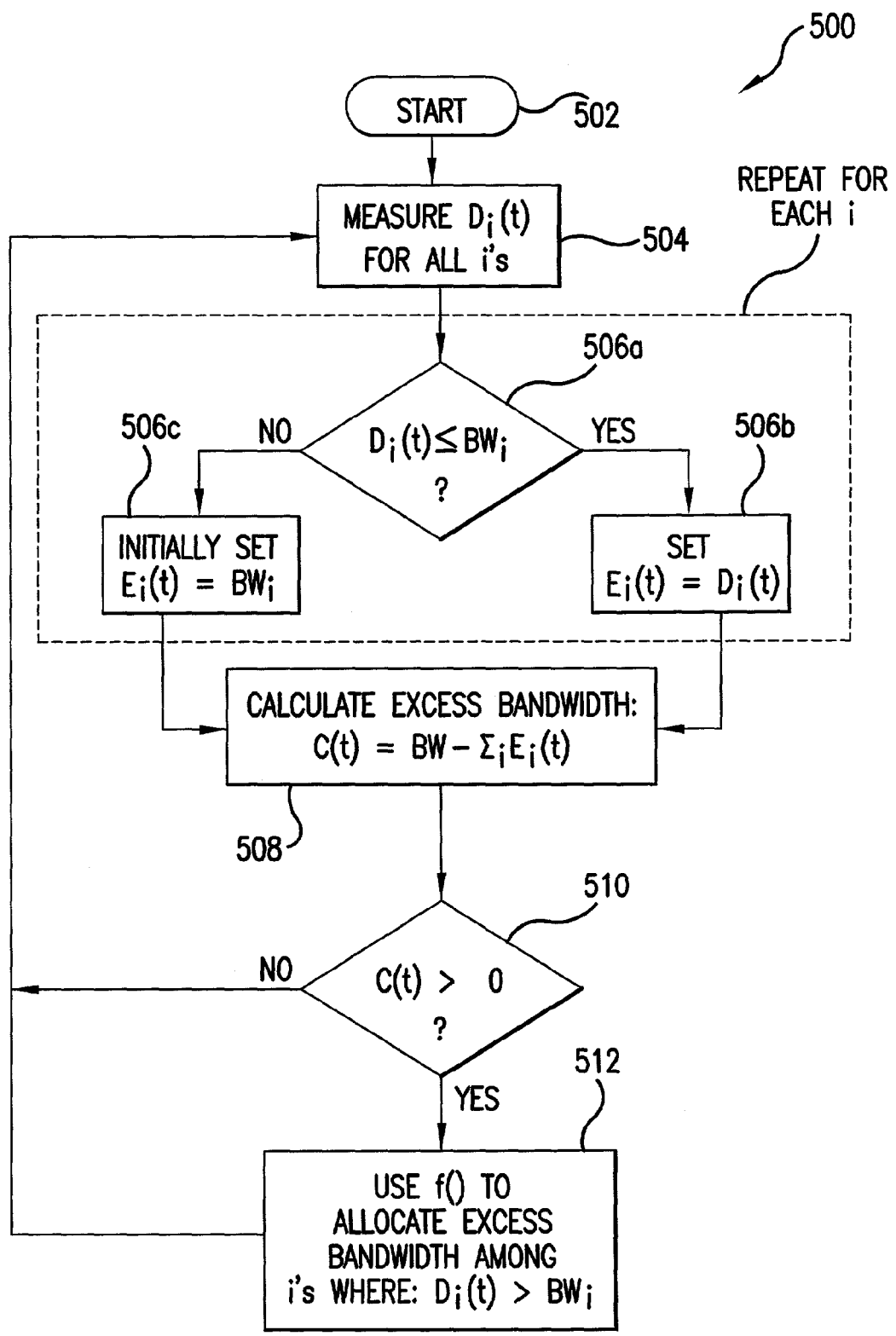
FIG. 5 is a flowchart describing a category bandwidth allocation process in an embodiment of the present invention.

Referring to FIG. 5, a flowchart illustrating a category bandwidth allocation process 500, in an embodiment of the present invention, is shown. Prior to the execution of process 500, there exist nominal bandwidth amounts $BW_i$ for each category i, such that:

$$\sum_i BW_i \leq BW,$$

as explained above.

Category bandwidth allocation process 500 begins at step 502. In step 502 a main loop is entered in which, in an embodiment, a scheduler executing on LT 102 will allocate bandwidth to each category i. In such an embodiment, process 500 utilizes a time window W (measured in units of time, e.g., 1 millisecond) for looping purposes. That is, FIG. 5 illustrates the allocation of bandwidth to the different categories at each time window W. The current time is denoted by t. Control then passes from step 502 to step 504.

In step 504, $D_i(t)$, the current demand of category i (i.e., an integer number of slots, each having a fixed bit length, required to transmit the entire contents of category i packets) at time t is determined for all i's.

In step 506a, $D_i(t)$ is tested to determine if the condition $D_i(t) \leq BW_I$ is satisfied. If so, $E_i(t)$—the bandwidth allocated to the i-th category—is set equal to its demand in step 506b. Otherwise, $D_i(t) > BW_I$, and $E_i(t)$ is initially set to $BW_I$ in step 506c. As will be appreciated by one skilled in the relevant art(s) after reading the description herein, steps 506a-c are repeated for each category i before process 500 proceeds to step 508.

In step 508, it is determined if there is surplus bandwidth available for allocation among all the categories i whose demand exceeds its initial nominal bandwidth allocation (i.e., those categories where $D_i(t) > BW_I$). The surplus of bandwidth at time t, C(t), is then defined to be:

$$C(t) = BW - \sum_i E_i(t).$$

In step 510, it is determined if there is actually excess (i.e., a surplus) of bandwidth BW. One will note that there is surplus bandwidth if the demand of some of the categories is less than their nominal bandwidths. If there is a surplus, it must be allocated among the categories i whose demand $D_i(t)$ exceeds their nominal allocation $BW_I$. This is accomplished, in step 512, by a function $f$ that determines the effective bandwidth, $E_i(t)$, for each such category. Function $f$ is described in more detail below.

Process 500, after executing step 512 if there is a surplus, or after step 510 if there is not a surplus, returns to the start of the main loop (i.e., step 504). As will be apparent to one skilled in the relevant art(s) after reading the description herein, process 500 will loop once every time window W.

In general, $f$ can be a function of all $D_i$'s, $P_i$'s, $BW_i$'s, W, and t. Consequently, $f$ can be made as complex as including all traffic prediction parameters. Because $f$ is calculated often within process 500, however, in a preferred embodiment it should be kept simple. Given that some of the parameters are potentially inaccurate, it is not clear that a complex function $f$ will actually render a better scheduler.

In one embodiment, chosen for simplicity only, $P_i$ and $BW_I$ are chosen as the parameters for function $f$. Further, in an embodiment of the present invention, a "min-max weighted fairness" scheme is utilized as the function $f$ for allocating surplus bandwidth. In such a scheme, weights, $w_i$, associated with the categories must be determined. Based on the two parameters, $P_I$ and $BW_I$, chosen for function $f$ in an embodiment of the present invention, the smaller the excess subscription factor of a category, the higher its weight should be; and the higher the nominal bandwidth allocated to a category, the higher its weight should be. In an embodiment:

$$w_i = BW_i \times \frac{\alpha}{P_i};$$

where $\alpha \leq 1$ and can be chosen freely to balance between the relative importance of the two parameters.

V. Allocation of Bandwidth to Users Within Service Categories

As mentioned above, the method and computer program product of the present invention first allocate bandwidth among the service categories handled by the network (i.e., process 500), and then must allocate bandwidth among the several users within each category. In an embodiment of the present invention, the allocation of bandwidth between the different users j (assigned to an LNTs 202 within an NT 106 on a premises 110) within each category i is accomplished in the same manner as the allocation to the different categories (i.e., process 500) described above.

Similar to the nominal bandwidth $BW_i$ assigned to each category, each user j is allocated a guaranteed bandwidth, $CW_j$, that it requested at subscription time (along with the service category selection). The guaranteed bandwidth that a user requests and subscribes to is typically equal to the average traffic that the user expects to generate or may simply be based on what the user is willing to pay the provider for.

The user bandwidth allocation process—which mirrors category bandwidth allocation process 500—is described in terms of the following parameters listed in Table 2.

TABLE 2

| Parameter | Definition |
|---|---|
| CW | the total amount of available bandwidth to the category (equal to $E_i(t)$ assigned to the category as a result of process 500) |
| $CW_j$ | the nominal amount of bandwidth allocated to the j-th user of the category. |
| $E_j(t)$ | the effective amount of bandwidth allocated to the j-th user at time t |
| $D_j(t)$ | the current demand in the j-th user at time t |

Figure 6:
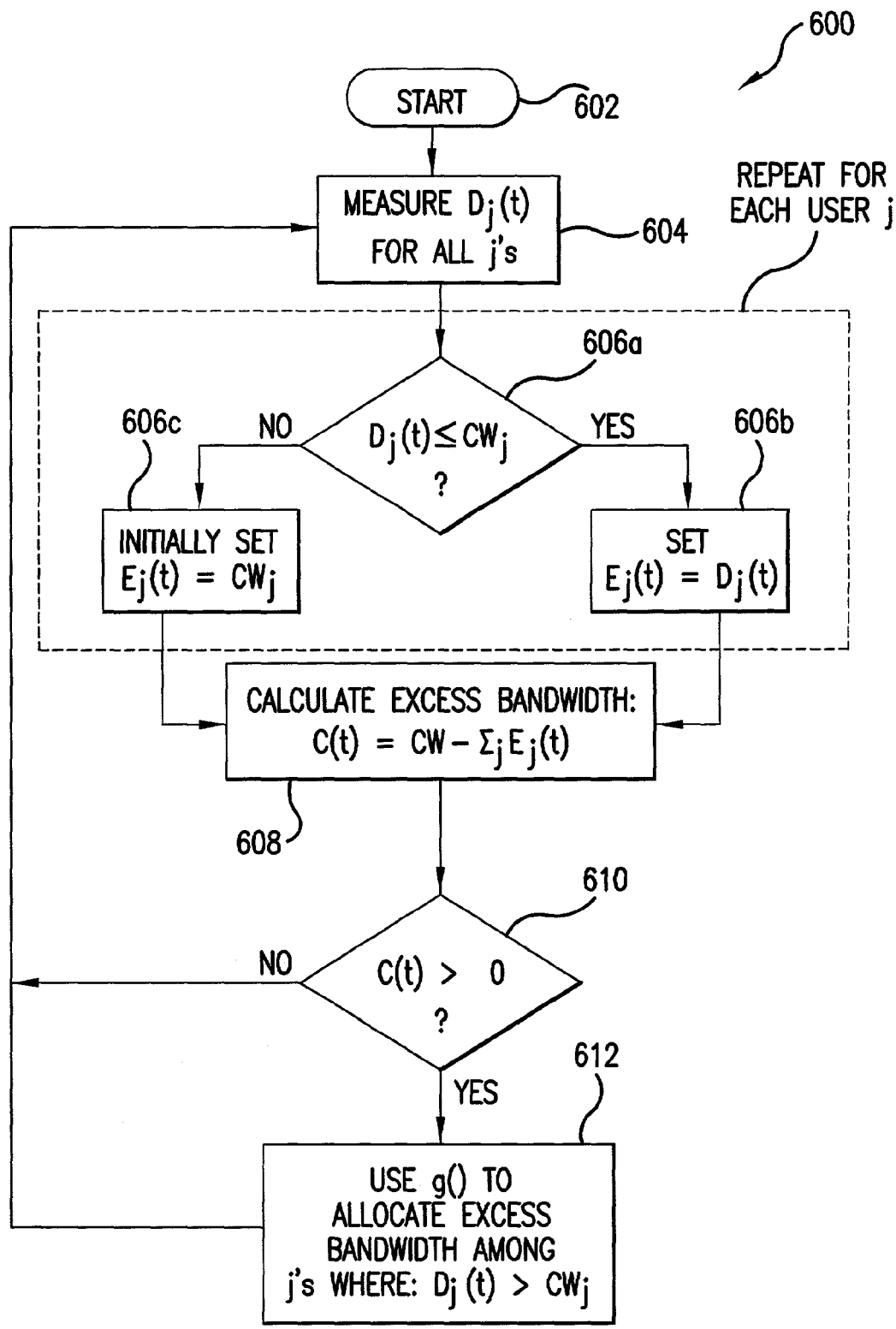
FIG. 6 is a flow chart describing a user bandwidth allocation process in an embodiment of the present invention.

Referring to FIG. 6, a flowchart illustrating a user bandwidth allocation process 600, in an embodiment of the present invention, is shown.

User bandwidth allocation process 600 begins at step 602. In step 602 a main loop is entered in which, in an embodiment, a scheduler executing on LT 102 will allocate bandwidth to each user j. In such an embodiment, process 600 utilizes a time window W (measured in units of time, e.g., 1 millisecond) for looping purposes. That is, FIG. 6 illustrates the allocation of bandwidth to the different users at each time window W. The current time is denoted by t. Control then passes from step 602 to step 604.

In step 604, $D_j(t)$, the current demand of user j (i.e., an integer number of slots, each having a fixed bit length, required to transmit the entire contents of user j's packets) at time t is determined for all users.

In step 606a, $D_j(t)$ is tested to determine if the condition $D_j(t) \leq CW_j$ is satisfied. If so, $E_j(t)$—the bandwidth allocated to the j-th user—is set equal to its demand in step 606b. Otherwise, $D_j(t) > CW_j$, and $E_j(t)$ is initially set to $CW_j$ in step 606c. As will be appreciated by one skilled in the relevant art(s) after reading the description herein, steps 606a-c are repeated for each user j before process 600 proceeds to step 608.

In step 608, it is determined if there is surplus bandwidth available for allocation among all the users j whose demand exceeds its initial nominal bandwidth allocation (i.e., those users where $D_j(t) > CW_j$). The surplus of bandwidth at time t, C(t), is then defined to be:

$$C(t) = CW - \sum_j E_j(t).$$

In step 610, it is determined if there is actually excess (i.e., a surplus) of bandwidth CW. If there is surplus bandwidth, in one embodiment, it is distributed using a distribution function g in the same manner as step 512 described above with respect to category bandwidth allocation process 500. A reasonable choice for function g is min-max weighting. However, a new set of weights $w_j$ must be defined. In an embodiment, the weight (or priority) of a user is a function of its guaranteed bandwidth. The higher the nominal bandwidth, $CW_j$, subscribed by a user, the higher its weight should be. Thus, the guaranteed bandwidth of a user can be used as its weight. (In an embodiment, functions $f$ and $g$ may use the same or different parameters.)

Process 600, after executing step 612 if there is a surplus, or after step 610 if there is not a surplus, returns to the start of the main loop (i.e., step 604). As will be apparent to one skilled in the relevant art(s) after reading the description herein, like process 500, process 600 will loop once every time window W.

User bandwidth allocation process 600, as will be appreciated by one skilled in the relevant art(s) after reading the description herein, is repeated for each category i whose bandwidth allocation $E_i(t)$ (=CW(t)) is first assigned by category bandwidth allocation process 500 described above.

VI. Types of QoS Delivered

The scheduler of the present invention supports the following QoS services which can be provided to subscribers by the network service provider operating an LT 102: Leased Line; Zero-Jitter Flow; Guaranteed Bandwidth; and Best Effort. Each of these services is explained in more detail below.

The Leased Line (P=0) service is actually a portion of the bandwidth that is excluded from the dynamic allocation scheme. Bandwidth is assigned in units of 1/W, and is allocated cyclically in every window. If a user transmits less data than the allocated bandwidth, then some of the assigned slots will remain idle. Such a service provides a constant bit rate (CBR) service.

The Zero-Jitter Flow (P=0) service is similar to a Leased Line service except that the bandwidth guarantees apply only per flow. When a flow is initiated, the scheduling may be delayed by a few windows, but once started the flow is allocated cyclically as in the case of a Leased Line service. A flow starts with the appearance of a packet in a window and is terminated when no packet appears in a certain number of consecutive windows. A bound of zero on the jitter is provided, but unlike the Leased Line service, this category does participate in the dynamic allocation scheme, at the expense of a slight delay.

The Guaranteed Bandwidth service is a Best Effort service with P=0, which means that packets will never be delayed or lost. No jitter guarantees, however, are given, other than the obvious bound of 2W.

The Best Effort (P>0) service is the typical service in which packets are transmitted in a first-in-first-out (FIFO) manner and excess traffic in a window is delayed (buffered) to the next window(s), subject to buffer availability. Various services corresponding to different values of P can co-exist. Note that if a user "purchases" a guaranteed bandwidth R with an excess factor P, but consistently transmits at a rate R/(1+P), then none of its packets will be lost; in fact this looks like Guaranteed Bandwidth.

VII. Example Implementations

The present invention (i.e., the scheduler executing on LT 102 and/or any part(s) or function(s) thereof) may be implemented using hardware, software or a combination thereof and may be implemented in one or more computer systems or other processing systems. In fact, in one embodiment, the invention is directed toward one or more computer systems capable of carrying out the functionality described herein.

Figure 4:
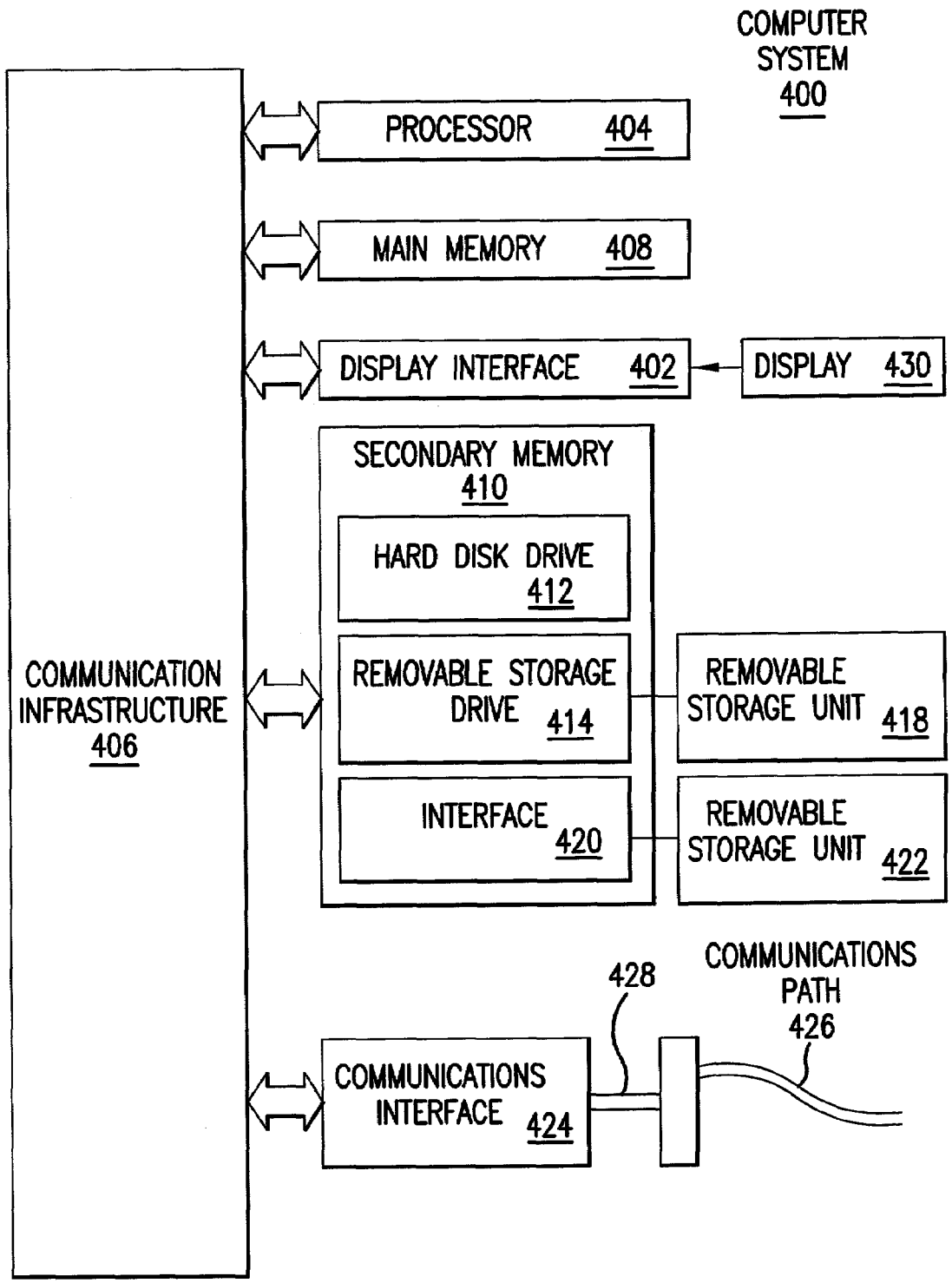
FIG. 4 is a block diagram of an exemplary computer system useful for implementing the present invention.

An example of a computer system 400 is shown in FIG. 4. The computer system 400 includes one or more processors, such as processor 404. The processor 404 is connected to a communication infrastructure 406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 400 can include a display interface 402 that forwards graphics, text, and other data from the communication infrastructure 406 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418, represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 414, a hard disk installed in hard disk drive 412, and signals 428. These computer program products provide software to computer system 400. The invention is directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VIII. Conclusion

While various embodiments of the present invention have been described above, it should be understood that they have been presented by way of example and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method for allocating the available upstream bandwidth, BW, among service categories within a point to multi-point communications network, comprising the steps of:

allocating a nominal upstream bandwidth amount, $BW_i$, to each category i of a plurality of service categories within the network;

allocating an excess subscription factor, $P_i$, to each category i of said plurality of service categories within the network;

measuring the actual upstream bandwidth demand at a time t, $D_i(t)$, for each of said plurality of service categories;

initially setting a first set of effective upstream bandwidth amounts, $E_i(t)$, equal to said nominal upstream bandwidth amount, $BW_i$, for each of said plurality of service categories whose $D_i(t) > BW_i$;

determining whether there is excess upstream bandwidth, $C(t)$, to be distributed among said plurality of service categories within the network utilizing the equation $$C(t) = BW - \sum_i E_i(t),$$

said determination being positive when $C(t) > 0$; and distributing, when said excess upstream bandwidth determination step is positive, said excess upstream bandwidth, $C(t)$, among said first set of effective upstream bandwidth amounts, $E_i(t)$, utilizing a function $f$;

wherein the function $f$ is a min-max weighted fairness scheme utilizing said nominal upstream bandwidth amounts $BW_i$ and said excess subscription factors $P_i$ as parameters and wherein a plurality of weights, $w_i$, are assigned to each of said plurality of service categories corresponding to said first set of effective upstream bandwidth amounts utilizing the formula $$w_i = BW_i \times \frac{\alpha}{P_i}$$

wherein $\alpha$ a is a number less than or equal to 1 and represents a relative importance between $BW_i$, and $P_i$.

2. The method of claim 1, further comprising the step of:

setting a second set of effective upstream bandwidth amounts, $E_i(t)$, equal to said actual upstream bandwidth demand, $D_i(t)$, for each of said plurality of service categories whose $D_i(t) \leq BW_i$.

3. A Line Termination unit capable of allocating available upstream bandwidth within a point to multi-point communications network that supports multiple service categories, comprising:

means for allocating a nominal upstream bandwidth amount to each of a plurality of service categories within the network;

means for measuring, at a pre-determined interval, the actual upstream bandwidth demand for each of said plurality of service categories;

means for initially setting a first set of effective upstream bandwidth amounts equal to said actual upstream bandwidth demand for each of said plurality of service categories whose said actual upstream bandwidth demand exceeds its said nominal upstream bandwidth amount;

means for setting a second set of effective upstream bandwidth amounts equal to said nominal upstream bandwidth amount for each of said plurality of service categories whose said actual upstream bandwidth demand does not exceed its said nominal upstream bandwidth amount;

means for determining whether there is excess upstream bandwidth to be distributed among said plurality of service categories within the network; and first means for distributing, responsive to said means for determining excess upstream bandwidth, said excess upstream bandwidth among said first set of effective upstream bandwidth amounts utilizing a function $f$;

wherein the function $f$ is a min-max weighted fairness scheme utilizing said nominal upstream bandwidth amounts and said excess subscription factors as parameters and wherein a plurality of weights, $w_i$, are assigned to each of said plurality of service categories corresponding to said first set of effective upstream bandwidth amounts utilizing the formula $$w_i = BW_i \times \frac{\alpha}{P_i}$$

wherein $BW_i$ is the nominal excess upstream bandwith amount for a service category i, $P_i$ is the excess subscription factor for a service category i, and $\alpha$ is a number less than or equal to 1 and represents a relative importance between $BW_i$ and $P_i$ for a service category i; and second means for distributing, responsive to said first means for distributing, said first and second sets of effective upstream bandwidth amounts among said plurality of users within each of said plurality of categories.

4. The Line Termination unit of claim 3, wherein said second means for distributing, comprises:
- means for allocating a nominal upstream bandwidth amount to each of said plurality of users within each of said plurality of service categories within the network;
- means for measuring, at a pre-determined interval, the actual upstream bandwidth demand for each of said plurality of users;
- means for initially setting a first set of effective upstream bandwidth amounts equal to said actual upstream bandwidth demand for each of said plurality of users whose said actual upstream bandwidth demand exceeds its said nominal upstream bandwidth amount;
- means for setting a second set of effective upstream bandwidth amounts equal to said nominal upstream bandwidth amount for each of said plurality of users whose said actual upstream bandwidth demand does not exceed its said nominal upstream bandwidth amount;
- means for determining whether there is excess upstream bandwidth to be distributed among said plurality of users within each of said plurality of service categories within the network; and
- means for distributing, responsive to said means for determining excess upstream bandwidth, said excess upstream bandwidth among said first set of effective upstream bandwidth amounts utilizing a function g.

5. A computer program product comprising a computer usable medium having control logic stored therein for causing a computer to allocate the available upstream bandwidth, BW, among service categories within a point to multi-point communications network, said control logic comprising:
- first computer readable program code means for causing the computer to allocate a nominal upstream bandwidth amount, $BW_i$, to each category i of a plurality of service categories within the network;
- second computer readable program code means for causing the computer to allocate an excess subscription factor, $P_i$, to each category i of said plurality of service categories within the network;
- third computer readable program code means for causing the computer to measure the actual upstream bandwidth demand at a time t, $D_i(t)$, for each of said plurality of service categories;
- fourth computer readable program code means for causing the computer to initially set a first set of effective upstream bandwidth amounts, $E_i(t)$, equal to said nominal upstream bandwidth amount, $BW_i$, for each of said plurality of service categories whose $D_i(t) > BW_i$;
- fifth computer readable program code means for causing the computer to determine whether there is excess upstream bandwidth, C(t), to be distributed among said plurality of service categories within the network utilizing the equation $$C(t) = BW - \sum_i E_i(t),$$

said determination being positive when C(t)>0; and
- sixth computer readable program code means for causing the computer to distribute, when excess upstream bandwidth is available, said excess upstream bandwidth, C(t), among said first set of effective upstream bandwidth amounts, $E_i(t)$, utilizing a function $f$; wherein the function $f$ is a min-max weighted fairness scheme utilizing said nominal upstream bandwidth amounts $BW_i$ and said excess subscription factors $P_i$ as parameters and wherein a plurality of weights, $w_i$, are assigned to each of said plurality of service categories corresponding to said first set of effective upstream bandwidth amounts utilizing the formula $$w_i = BW_i \times \frac{\alpha}{P_i}$$

wherein α is a number less than or equal to 1 and represents a relative importance between $BW_i$ and $P_i$.

* * * * *